United States Patent [19]
Fritz et al.

[11] 3,802,995
[45] Apr. 9, 1974

[54] NUCLEAR FUEL ASSEMBLY

[75] Inventors: James R. Fritz; Frederick R. Channon, both of San Jose, Calif.

[73] Assignee: General Electric Company, San Jose, Calif.

[22] Filed: Sept. 30, 1971

[21] Appl. No.: 185,115

[52] U.S. Cl. .............. 176/76, 176/73, 176/78, 176/79, 176/81
[51] Int. Cl. .............. G21c 3/34, G21c 15/22
[58] Field of Search ........... 176/66, 67, 68, 73, 74, 176/76, 78, 79, 81

[56] References Cited
UNITED STATES PATENTS

| | | | |
|---|---|---|---|
| 3,344,036 | 9/1967 | Haslam et al. | 176/76 X |
| 3,368,945 | 2/1968 | Keller et al. | 176/78 X |
| 3,104,219 | 9/1963 | Sulzer | 176/78 |
| 3,350,275 | 10/1967 | Venier et al. | 176/76 X |
| 3,510,398 | 5/1970 | Wood | 176/93 BD |
| 3,238,108 | 3/1966 | Deddens et al. | 176/78 |
| 3,275,525 | 9/1966 | Bloomster et al. | 176/73 |
| 3,341,420 | 9/1967 | Sevy | 176/18 |
| 3,510,397 | 5/1970 | Zettervall | 176/76 |
| 3,379,619 | 4/1968 | Andrews et al. | 176/76 |
| 3,147,191 | 1/1964 | Crowther | 176/68 |

FOREIGN PATENTS OR APPLICATIONS

| | | | |
|---|---|---|---|
| 1,148,881 | 4/1969 | Great Britain | 176/78 |
| 1,214,314 | 7/1968 | Great Britain | 176/61 |
| 291,909 | 5/1967 | Australia | 176/38 |

*Primary Examiner*—Carl D. Quarforth
*Assistant Examiner*—Roger S. Gaither
*Attorney, Agent, or Firm*—Ivor J. James, Jr.; Samuel E. Turner; Sam E. Laub

[57] ABSTRACT

A fuel assembly for a nuclear reactor wherein a central cluster of the fuel rods of the assembly are fueled with initial plutonium and wherein a water tube is provided through the cluster to increase the neutron moderation in the region of the plutonium fuel, the water tube also providing axial support for the fuel rod spacers.

21 Claims, 12 Drawing Figures

PATENTED APR 9 1974 3,802,995

INVENTORS:

JAMES R. FRITZ
FREDERICK R. CHANNON

BY: Samuel E. Turner

ATTORNEY

NUCLEAR FUEL ASSEMBLY

BACKGROUND

The release of large amounts of energy through nuclear fission is now well known. Briefly, a fissile atom, such as U-233, U-235, Pu-239 or Pu-241 absorbs a neutron and undergoes a nuclear disintegration which produces fission products of lower atomic weight with great kinetic energy and several neutrons also of high energy. This energy is dissipated as heat in the fuel elements of the reactor. This heat may be removed by passing a coolant in heat exchange relation to the fuel and the heat can be extracted from the coolant to perform useful work. Nuclear reactors are discussed in greater detail, for example, by M. M. El-Wakil in "Nuclear Power Engineering," McGraw-Hill Book Company, Inc., 1962.

In a known type of nuclear reactor, for example, as used in the Dresden Nuclear Power Station near Chicago, Illinois, the reactor core is of the heterogeneous type. That is, the nuclear fuel is in the form of elongated cladded rods. These fuel rods or elements are grouped together and contained in open-ended tubular flow channels to form separately removable fuel assemblies or bundles. A sufficient number of fuel assemblies are arranged in a matrix, approximately a right circular cylinder, to form the nuclear reactor core capable of self-sustained fission reaction. The core is submersed in a fluid, such as light water, which serves both as a coolant and as a neutron moderator. Thus, from the point of view of fueling or refueling the reactor core, the removable fuel assembly is the basic replaceable subdivision of the fuel core.

A typical fuel assembly is formed, for example, by a 7 × 7 array of spaced fuel rods supported between upper and lower tie plates, the rods being several feet in length, on the order of one-half inch in diameter and spaced from one another by a fraction of an inch. To provide proper coolant flow past the fuel rods it is important to maintain the fuel rods in fixed spaced relation and restrain them from bowing and vibrating during reactor operation. A plurality of fuel rod spacers positioned in spaced relation along the length of the fuel assembly are provided for this purpose. Such spacers are shown, for example, by J. L. Lass et al in copending U.S. Pat. application Ser. No. 802,326, filed Feb. 17, 1969, now U.S. Pat. No. 3,654,077.

A problem in the design of such a fuel assembly is to provide an efficient, effective structure for maintaining the fuel rod spacers in their axial spaced positions without the use of excessive structural materials. In some previous arrangements, special structural members have been provided for this purpose. It is extremely important to minimize the amount of structural material in a fuel core because such materials unproductively capture neutrons and an additional amount of costly fuel is required in the core to compensate for this ueutron loss. Thus it is undesirable to use a structural neutron whose only purpose is to retain the spacers. In other known arrangements the spacers are axially retained by engagement with lugs or the like on one or more of the fueled rods. However, use of a fueled element for spacer capture presents problems of high temperature strength in the face of the need to minimize cladding thickness in a fueled rod.

Thus an object of the present invention is to provide an improved arrangement for retaining the fuel rod spacers in position in a fuel assembly.

To provide a fuel cycle period of reasonable length, the fuel core is loaded with excess fuel which provides an initial excess of reactivity that must be controlled by a system of neutron absorbing or poison materials. Typically, the control system includes mechanical control in the form of a plurality of selectively actuatable, poison containing control rods which can be inserted into and withdrawn from the core as required. A system of fixed burnable poison mixed with the fuel or otherwise contained in the core also may be used as disclosed, for example, by D. L. Fischer et al. in copending U.S. Pat. application Ser. No. 104,614, filed Jan. 7, 1971, now abandoned.

Nuclear power reactor fuel usually includes fertile atoms in addition to the above-noted fissile atoms. For example, a commonly used fuel consists of uranium dioxide ($UO_2$) in which about 2-3 percent of the uranium atoms are U-235 which are fissionable in a thermal neutron flux while the remaining uranium atoms are the fertile isotope U-238 which are not significantly fissionable in a thermal neutron flux. In the course of operating the reactor the fissionable atoms (U-235) are gradually consumed and a part of the fertile atoms (U-238) are converted to a fissionable plutonium isotope (Pu-239). The concentration of Pu-239 gradually rises and approaches an equilibrium value. Since the Pu-239 atoms are fissionable by thermal neutrons, they contribute to the maintenance of the chain fission reaction.

However, in a thermal reactor (a reactor in which most of the fissions result from neutrons in the thermal energy range) the rate of production of fissile atoms is less than the rate of fissile atom consumption. Furthermore, some of the fission products are neutron absorbers or poisons. Thus as the reactor is operated, fissile atoms are depleted, poisons build up and eventually some of the spent fuel must be removed and replaced by fresh fuel.

The spent, or irradiated, fuel removed from the reactor contains, in addition to a valuable quantity of the original fissile and fertile materials, a significant quantity of plutonium including fissile Pu-239 and Pu-241 and fertile Pu-240. Such spent fuel can be reprocessed to separate and recover the uranium and plutonium. It is desirable to utilize such plutonium fuel in refueling the reactor and/or in initial fueling of other reactors.

The use of plutonium fuel in a reactor core originally designed to use uranium fuel requires careful consideration of differences in reactor performance because of the difference in nuclear characteristics of the two fuels. For example, the thermal neutron capture and fission cross sections of the fissile plutonium isotopes, Pu-239 and Pu-241, are greater than those of fissile uranium U-235. The fissile nuclides Pu-239 and Pu-241 have large neutron cross section resonances at about 0.3 electron volts. The ratio of the probability of a neutron being parasitically captured in Pu-239 and Pu-241 to the probability of neutrons causing fission in these isotopes is considerably increased for neutrons with energies near these resonance energies. At thermal energies below the 0.3 electron volt resonance energies, the capture-to-fission ratio decreases. Also, the fertile isotope Pu-240 presents a large capture cross section for neutrons near one electron volt in energy.

For these reasons the nuclear and economic efficiency is improved by locating the plutonium in regions of low thermal neutron energy.

Advantageous arrangements for utilizing plutonium fuel, particularly in a thermal reactor core originally designed to use uranium fuel, are described by R. L. Crowther in copending U.S. Pat. application Ser. No. 347,916, filed 4 April 1973. As disclosed therein plutonium fuel is used in less than all of the fuel elements of the assembly to reduce the fabrication cost penalty of the highly toxic plutonium. In one disclosed embodiment, the plutonium fuel is placed in the outer or peripheral fuel elements adjacent the inter-assembly water gaps and, therefore, in zones of highest neutron moderation and lowest thermal neutron energy. This arrangement minimizes neutron capture-to-fission ratio for improved efficiency. In another disclosed embodiment, the plutonium fuel is placed in a central group or cluster of fuel elements which is surrounded by uranium fuel in the peripheral fuel elements. This arrangement provides increased thermal capability and decreases assembly-to-assembly mismatch. Where plutonium fuel is used in such a central cluster it is desirable to increase the neutron moderation therein since plutonium benefits greatly from a softer (lower energy) neutron spectrum because of the energy dependent characteristics of the plutonium cross sections.

Thus another object of the invention is to provide an improved arrangement for utilizing plutonium fuel in a thermal reactor.

Another object is to increase neutron moderation in the inner zone of a fuel assembly.

Another object is to more effectively utilize plutonium fuel in the inner zone of a fuel assembly.

These and other objects of the invention are achieved in accordance with the invention by providing a fuel assembly wherein a first group of fuel elements containing initial plutonium fuel are clustered in a central or inner zone while a second group of fuel elements containing uranium fuel, lacking significant initial plutonium fuel, occupy the peripheral zone of the fuel assembly in combination with one or more moderator or water containing tubes placed within the inner zone in the cluster of plutonium containing fuel elements to increase neutron moderation and lower the thermal neutron energy spectrum in this inner zone. To provide an improved arrangement for maintaining the fuel element spacers in position, a water tube is formed with lugs or the like which engage the spacers and restrain the spacers from axial displacement.

DRAWING

The invention is described more specifically with reference to the accompanying drawing wherein.

DESCRIPTION

Figure 1:
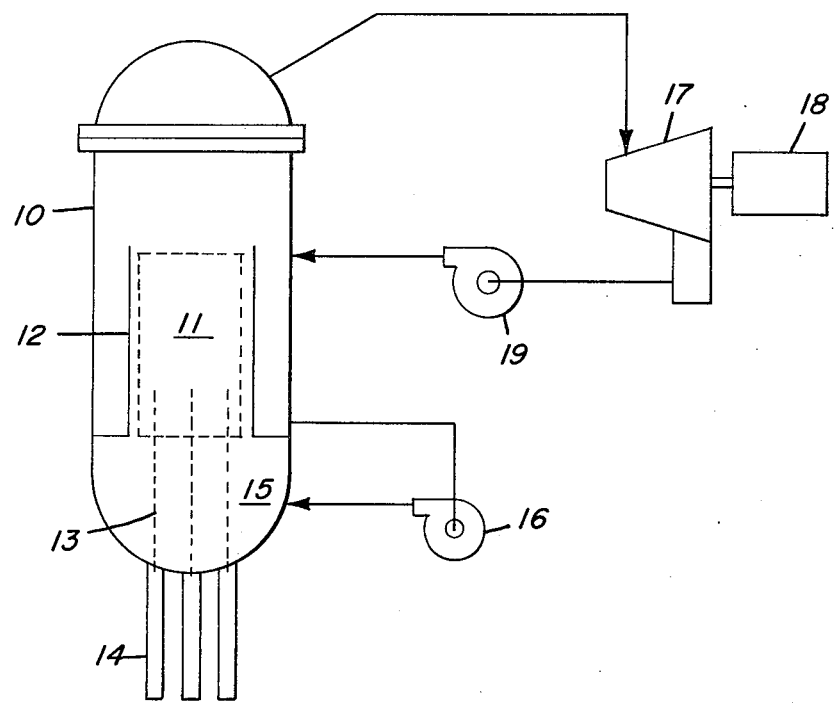
FIG. 1 is a schematic diagram of a nuclear power reactor.

The invention is described herein in connection with a boiling water reactor an example of which is illustrated schematically in FIG. 1. Such a reactor system includes a pressure vessel 10 containing a fuel core 11 comprised of an array of spaced fuel assemblies submersed in a moderator-coolant such as light water and surrounded by a shroud 12. A plurality of control rods 13 (shown in dotted lines) of cruciform cross section shape (see FIG. 2) and containing neutron absorbing material, are selectively insertable into spaces among the fuel assemblies by drive means 14 for mechanical control of the reactivity of the nuclear core.

A pump 16 circulates the coolant through the core 11 by taking coolant from the annular space around shroud 12 and pressurizing a plenum 15 by which the coolant is forced upward through the fuel assemblies of the core. The coolant removes heat from the fuel elements whereby a part of the coolant water is converted to steam. The steam thus produced is applied to a turbine 17 which drives an electric generator 18. Exhaust steam is condensed and returned to the vessel 10 by a feedwater pump 19.

Figure 2:
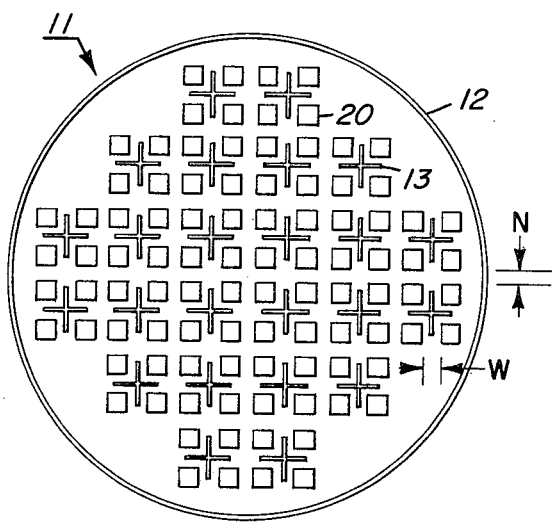
FIG. 2 is a plan view of the nuclear fuel core.

FIG. 2 is a plan view of the core 11. The core 11 is formed of a plurality of fuel assemblies 20 grouped together in groups of four surrounding each control rod 13. Narrow gaps (N) are provided between the groups of fuel assemblies while wider gaps (W) are required between the fuel assemblies of each group to receive the cruciform-shaped control rods 13. As mentioned hereinbefore, the core 11 is submersed in water contained by the shroud 12. Thus the space around the core and the spaces in gaps N and W are filled with water. Each of the fuel assemblies 20 is separately removable from the core. In a typical refueling operation about one-quarter of the fuel assemblies are replaced. For example, one fuel assembly of each of the groups of four fuel assemblies.

Figure 3:
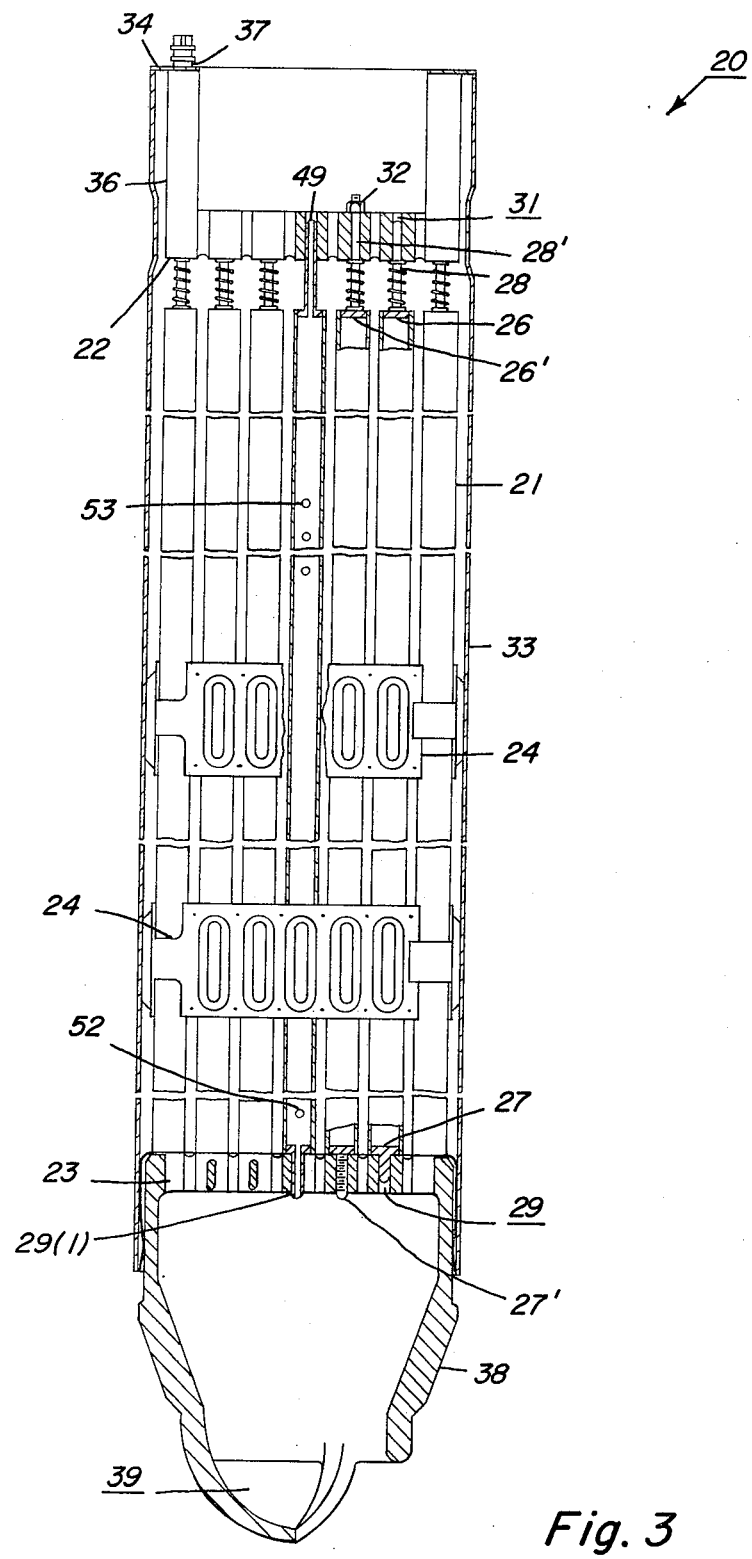
FIG. 3 is a longitudinal section view of a fuel assembly.

A fuel assembly 20 is illustrated in elevation view in FIG. 3. The fuel assembly 20 comprises a plurality of fuel elements or rods 21 supported between a skeletonized upper tie plate 22 and a skeletonized lower tie plate 23. The fuel rods 21 pass through a plurality of fuel rod spacers 24 which provide intermediate support to retain the elongated rods in spaced relation and restrain them from lateral vibration.

Each of the fuel rods 21 is formed of an elongated tube containing fissile fuel and other materials, such as fertile fuel, burnable poison, inert material or the like, sealed in the tube by upper and lower end plugs 26 and 27. Lower end plugs 27 are formed with a taper for registration and support in support cavities 29 formed in the lower tie plate 23. Upper end plugs 26 are formed with extensions 28 which fit into support cavities 31 in the upper tie plate 22.

Several of the support cavities 29 (for example, selected ones of the edge or peripheral cavities) in the lower tie plate 23 are formed with threads to receive fuel rods having threaded lower end plugs 27'. The extensions 28' of the upper end plugs 26' of these same fuel rods are elongated to pass through the cavities in the upper tie plate 22 and are formed with threads to receive retaining nuts 32. In this manner the upper and lower tie plates and the fuel rods are formed into a unitary structure.

The fuel assembly 20 further includes a thin-walled tubular flow channel 33, of substantially square cross section, sized to form a sliding fit over the upper and lower tie plates 22 and 23 and the spacers 24 so that the channel 33 readily may be mounted and removed. Fixed to the top end of the flow channel 33 is a tab 34 by which the channel is fastened to a standard 36 of upper tie plate 22 by means of a bolt 37.

The lower tie plate 23 is formed with a nose piece 38 adapted to support the fuel assembly 20 in a socket in a core support plate (not shown) in the reactor pressure vessel. The end of this nose piece is formed with openings 39 to receive the pressurized coolant from plenum 15 (FIG. 1) so that it flows upward among the fuel rods.

Figure 4:
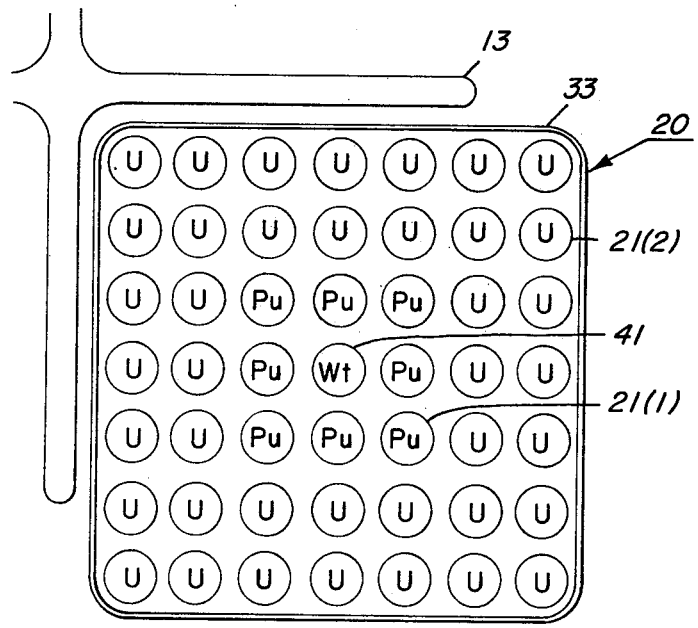
FIG. 4 is a schematic plan view of a first illustrated embodiment of a fuel assembly of the invention.

An embodiment of the fuel assembly 20 is illustrated in schematic plan view in FIG. 4. In accordance with one aspect of the invention a plurality of fuel rods 21(1) (legended Pu) contain initial fissile plutonium fuel and are arranged in a cluster or group in the inner fuel rod positions of the fuel assembly. The fuel rods 21(1) are surrounded by a plurality of fuel rods 21(2) (legended U) containing initial fissile uranium fuel free of significant initial plutonium and arranged in the peripheral fuel rod locations of the fuel assembly. As pointed out in the hereinbefore mentioned copending U.S. Pat. application Ser. No. 347,916, this arrangement increases thermal capability and alleviates problems of assembly-to-assembly mismatch. Also by placing plutonium fuel in less than all of the fuel rods, the cost penalty of plutonium fabrication is minimized.

However, as is clear from FIG. 2, the fuel assemblies are surrounded by a relatively large quantity of relatively cool water-moderator in the gaps W and N. Thus the peripheral fuel rods are exposed to a relatively soft neutron spectrum (neutrons of relatively low thermal energy) whereas the fuel rods in the inner hotter and less moderated region of the fuel assembly are exposed to a relatively harder (higher energy) neutron spectrum. It has been found that the efficiency of energy production of initial plutonium fuel in a central cluster, as shown in FIG. 4, is significantly increased by providing greater neutron moderation in this region.

Figure 5:
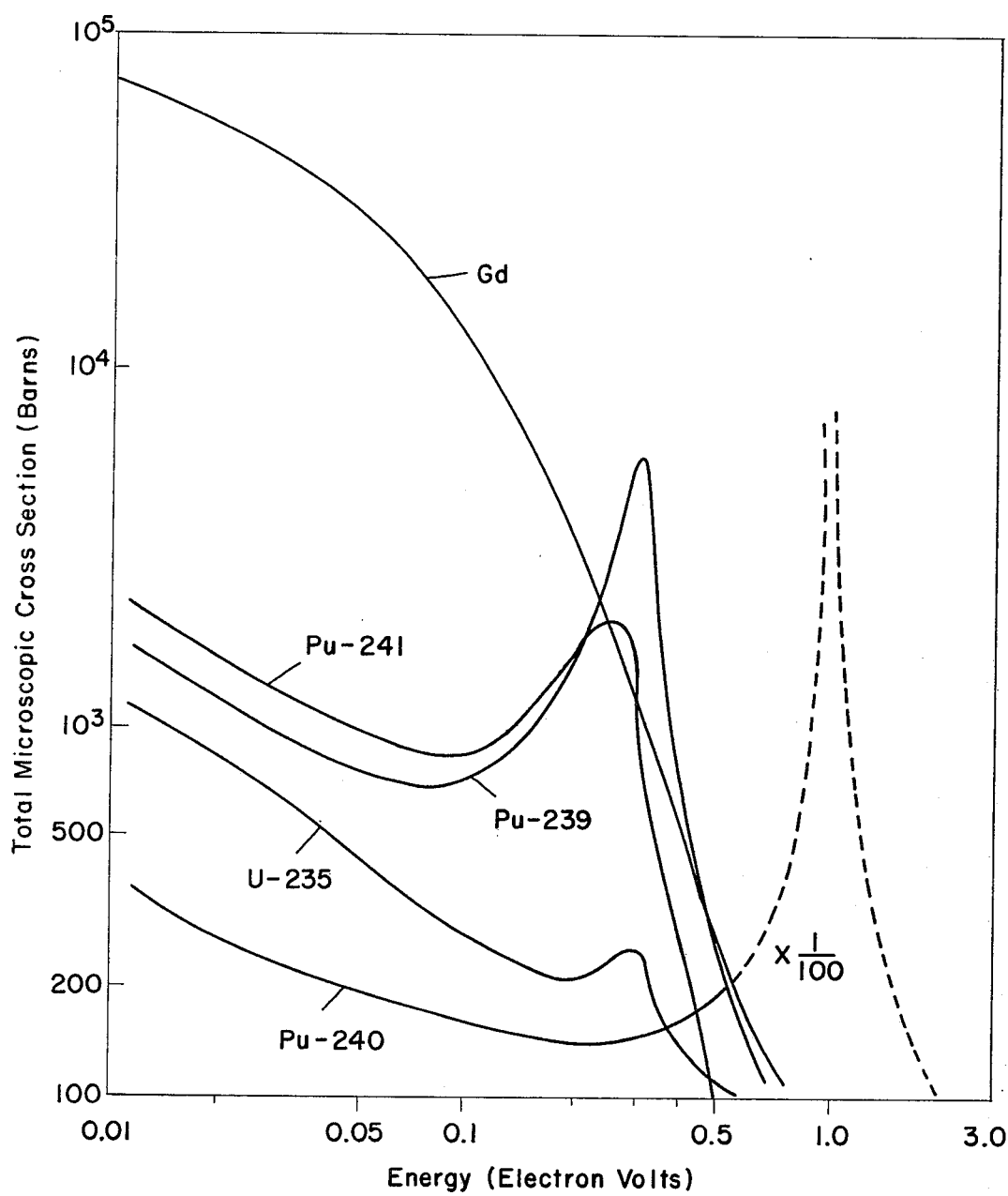
FIG. 5 illustrates the thermal energy dependent microscopic cross sections of gadolinium and uranium and plutonium isotopes.
Figure 6:
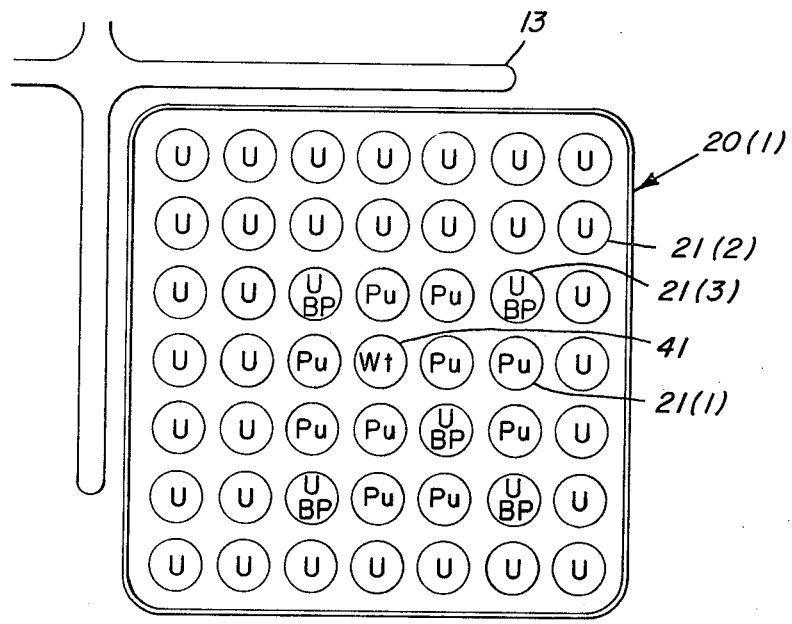
FIG. 6 is a schematic plan view of a second illustrated embodiment of a fuel assembly of the invention.
Figure 7:
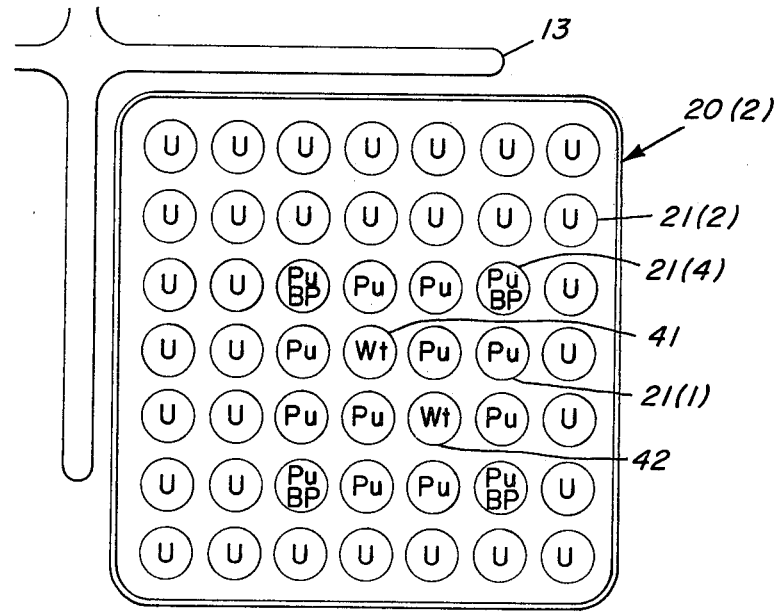
FIG. 7 is a schematic plan view of a third illustrated embodiment of a fuel assembly of the invention.
Figure 8:
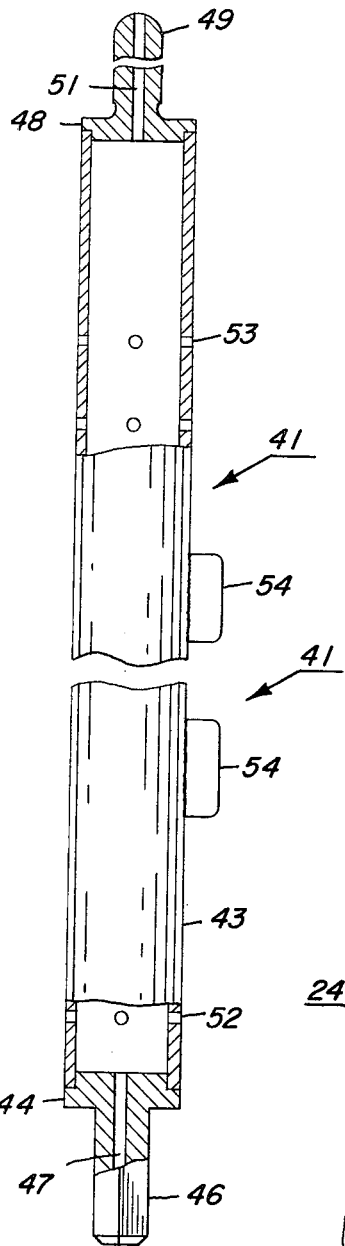
FIG. 8 is an elevation view, partly in section, of a moderator and spacer capture tube of the invention.

Thus in accordance with another aspect of the invention, a fuel rod in a central fuel rod position within the cluster of plutonium fueled rods 21(1) is replaced by a water tube 41 (legended Wt). By "within" the cluster is meant that the water tube is surrounded on all four sides by plutonium fueled rods as shown in FIGS. 4, 6 and 7. As described more specifically hereinafter the tube 41 is similar to a fuel rod except that it contains no fuel and it is apertured to permit flow of coolant water-moderator therethrough. Thus the increased neutron moderation provided by water tube 41 results in a cooler neutron spectrum for the plutonium fueled rods 21(1) to take advantage of the reduced capture-to-fission ratio in Pu-239 and Pu-241 and the reduced neutron capture in the fertile plutonium Pu-240 (as illustrated in FIG. 5). It is found that the use of a water tube through the plutonium fuel cluster reduces the amount of fissile plutonium required for a given energy output over the life of the fuel by as much as 2 percent. Advantageously, the plutonium in rods 21(1) may be mixed with natural or depleted uranium.

Variations of the basic arrangement shown in FIG. 4 are illustrated in FIGS. 6 and 7. In FIG. 6 a fuel assembly 20(1) is illustrated wherein a cluster of plutonium fueled fuel rods 21(1) are arranged in inner fuel rod positions around the central water tube 41. The plutonium cluster is advantageously offset from the center of the fuel assembly along the diagonal of the fuel assembly in the direction away from the influence of the control rod 13. Included in the cluster illustrated in FIG. 6 is a plurality of fuel rods 21(3) containing uranium fuel with which is mixed a burnable poison, such as gadolinium, samarium or the like, to control excess reactivity as described, for example, in copending U.S. Pat. application Ser. No. 104,614, filed Jan. 7, 1971, now abandoned.

In FIG. 7 a fuel assembly 20(2) is illustrated wherein a cluster of plutonium fueled rods 21(1) are arranged in inner fuel rod positions around the central water tube 41 and a similar second water tube 42. This arrangement is useful where greater moderation in the plutonium cluster is desired than is provided by a single water tube. Also illustrated in FIG. 7 is the use of burnable poison in a plurality of plutonium fueled rods 21(4).

As mentioned hereinbefore, a problem in the design of a fuel assembly is to provide efficient, effective means for retaining the fuel rod spacers 24 in their spaced positions without the use of special structural members and without compromising the operation or capability of other elements of the fuel assembly. (For example, an obvious possibility is to attach the spacers 24 to the flow channel 33. However, this would destroy the capability of ready removal of the channel from the fuel assembly.)

Thus in accordance with another aspect of the invention, one of the water tubes, such as water tube 41, is formed with means for capturing and retaining the fuel rod spacers 24. Details of the water tube spacer capture arrangement are illustrated in FIGS. 8–11 with reference also to the fuel assembly illustration of FIG. 3. An embodiment of the spacer capture water tube 41 is shown in elevation view in FIG. 8. It includes a continuous or unsegmented elongated tube 43 formed of material suitable for use in a reactor core such as stainless steel or zirconium. Attached to the lower end of tube 43 is a lower end plug 44. The lower end plug 44 is formed with an extension 46 having, for example, a square cross section. The extension 46 is adapted to fit into a special cavity 29(1) of matching shape in lower tie plate 23 (FIG. 3) to prevent rotation of the tube 41 after it is placed in position. The lower end plug 44 and its extension 46 may be formed with a central passage 47 to receive coolant from the nose piece 38.

Attached to the upper end of tube 43 is an upper end plug 48 formed with an extension 49 to fit into a support cavity 31 of upper tie plate 22. A central passage 51 is formed through end plug 48 and extension 49 to provide an exit for coolant-moderator flow through tube 43.

The tube 43 may also be formed with a plurality of coolant inlet holes 52 near the lower part of the tube 43 and a plurality of coolant outlet holes 53 in the upper part of the tube 43. The outlet holes 53 may be graduated in number and/or size so that a substantial portion of the relatively cool coolant in tube 43 exits therefrom at a desired elevation in the fuel assembly to enhance cooling and moderation of the adjacent fuel elements at that elevation, for example, in the upper half of the fuel bundle.

In accordance with the invention, the water tube 43 is formed with a plurality of radially extending, axially spaced fins or lugs 54, each of which is adapted to engage a respective one of the fuel rod spacers 24 by which the spacers 24 are retained in fixed axial position. These spacer engaging lugs 54 may be attached to the tube 43, for example, by welding.

Figure 9:
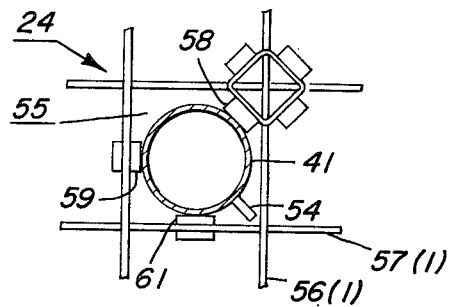
FIGS. 9, 10 and 11 are detail views (FIGS. 9 and 10 in plan and FIG. 11 in elevation) illustrating the engagement of the spacer capture tube with a fuel rod spacer.
Figure 10:
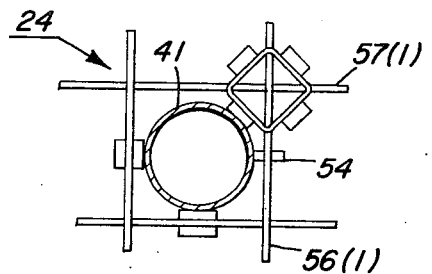
Figure 11:
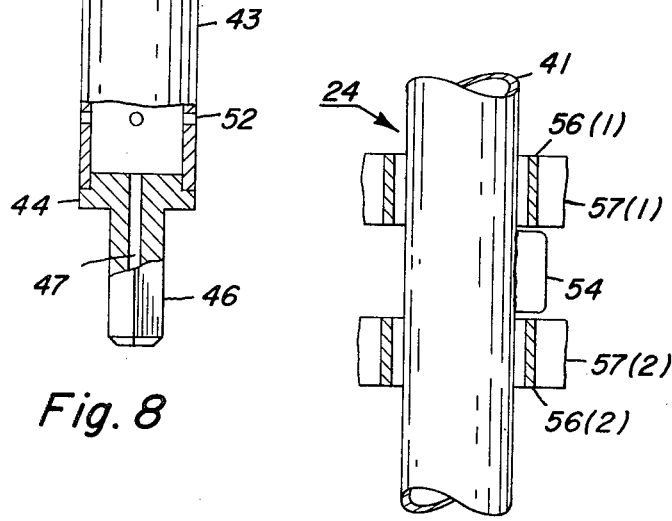

Insertion of the spacer capture water tube 41 into the fuel assembly and engagement of the spacers 24 is illustrated in FIGS. 9–11. A tube passage 55 of the spacers 24 is formed of upper and lower interlocking divider bars 56(1), 56(2), 57(1) and 57(2) as shown and described in greater detail in aforementioned U.S. patent No. 3,654,077. A spring 58 exerts a lateral force on tube 41 and forces it into lateral engagement with a pair of rigid members 59 and 61. The tube 41 is inserted into the passage 55, as shown in FIG. 9, such that the lugs 54 extend along the diagonal of the passage 55 toward the corner between the rigid member 61 and spring 58 until the lugs 54 are in an axial position intermediate of the upper and lower divider bars of the spacer. The tube 41 is then rotated 45° counterclockwise, as shown in FIG. 10 to bring the lugs 54 between the upper and lower divider bars 56(1) and 56(2) as shown in FIG. 11. To prevent further rotation of tube 41, the extension 46 of lower end plug 44 is, as mentioned hereinbefore, formed with a square cross section. With the spacers 24 now captured by the lugs 54, the rod 41 and the spacers are moved downward whereby the extension 46 is inserted into the mating socket or cavity 29(1) of the lower tie plate 23 (FIG. 3).

Figure 12:
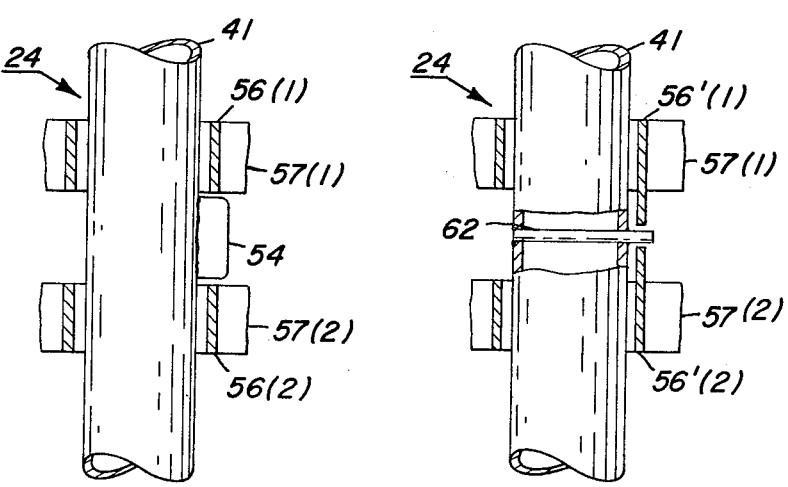
FIG. 12 illustrates an alternate form of spacer capture lug.

An alternate form of spacer capture lug is illustrated in FIG. 12 wherein a lug or pin 62 is welded in opposite holes in the tube 43 of water tube 41 such that the pin 62 projects between spacer bars 56'(1) and 56'(2) to thus engage the spacer 24 to prevent axial displacement thereof.

The above-described combination has a number of outstanding advantages. The water tube (or tubes) provide increased neutron moderation in the plutonium fuel cluster to enhance the performance of the plutonium fuel. The spacer capture water tube 41 performs the dual function of providing increased moderation in the central region of the fuel assembly and retaining the spacers 24 in axial position whereby the need for additional, special spacer retaining structural member and the problems of using a fueled rod for spacer capture are eliminated.

By way of example, the following table presents initial parameters of the embodiment of the fuel assembly of the invention illustrated in FIG. 6.

| Fuel assembly 20(1) | |
| --- | --- |
| Number of fuel rod positions | 49 |
| Number of fueled rods | 48 |
| Number of water tubes | 1 |
| Number of plutonium fueled rods 21(1) | 10 |
|   Average fissile Pu content | 2.8 wt. % |
|   Average natural U content | 96.2 wt. % |
| Number of Uranium fueled rods 21(2) | 33 |
|   Average fissile Pu content | none |
|   Average fissile U content | 2.5 wt. % |
| Number of poisoned fuel rods 21(3) | 5 |
|   Average fissile Pu content | none |
|   Average fissile U content | 2.9 wt. % |
|   Average Gd content | 2.0 wt. % |

What is claimed is:

1. A fuel assembly for use with a plurality of fuel assemblies and a neutron moderator in a nuclear reactor core, said fuel assembly comprising: a plurality of elongated fuel elements arranged in spaced array, including a first group of a plurality of said fuel elements containing initial fissile plutonium and a second group of a plurality of said fuel elements wherein the initial fissile fuel therein consists of enriched fissile uranium; an elongated continuous hollow tube positioned within said first group of fuel elements; means for directing a flow of said moderator into said tube; means for discharging said moderator from said tube; a plurality of fuel element spacers in axially spaced positions for laterally supporting said fuel elements, and spacer capture means comprising a plurality of axially spaced lugs fixed to said tube for engaging said spacers to retain said spacers in said axially spaced positions.

2. The fuel assembly of claim 1 wherein said tube is of substantially the same outside diameter as said fuel elements.

3. The fuel assembly of claim 1 wherein said means for discharging said moderator from said tube consists of apertures in one-half the length of said tube.

4. The fuel assembly of claim 1 wherein said spacers are formed with passages for said lugs whereby said spacers are axially movable along said tube to said axially spaced positions when said tube is in a first angular position with respect to said spacers.

5. The fuel assembly of claim 4 further including releasable means to prevent rotation of said tube to retain said tube in a second angular position with respect to said spacers wherein said lugs engage said spacers to retain said spacers in said axially spaced positions.

6. A nuclear fuel assembly comprising: a plurality of nuclear fuel elements; a support means including an upper tie plate and a lower tie plate providing a plurality of support positions to support said fuel elements in spaced array; an elongated continuous hollow tube supported in one of said support positions; means for directing a flow of a neutron moderator into said tube; means for discharging said moderator from said tube; a plurality of axially spaced spacers for laterally supporting said fuel elements and said tube; spacer capture means fixed to said tube, said spacer capture means being effective in a first angular position of said tube with respect to said spacers to allow axial movement of said spacers along said tube and being effective in a second angular position of said tube with respect to said spacers to engage said spacers to prevent substantial axial displacement of said spacers along said tube; an end member fixed to one end of said tube; a cavity in one of said tie plates for receiving said end member; and means formed in said cavity for engaging said end member to retain said tube in said second angular position.

7. The fuel assembly of claim 6 wherein said tube is of substantially the same outside diameter as said fuel elements.

8. The fuel assembly of claim 6 wherein said means for discharging said moderator from said tube comprises apertures in the upper half of said tube.

9. The fuel assembly of claim 6 wherein said spacer capture means includes a plurality of axially spaced lugs fixed to said tube for engaging said spacers.

10. The fuel assembly of claim 6 wherein said end member comprises an end plug of square cross section fixed to said tube and wherein said cavity is formed with a mating square socket.

11. The fuel assembly of claim 6 wherein said tube includes end plugs at each end and wherein said end plugs are formed with moderator passages for admitting moderator into and discharging moderator from said tube.

12. A fuel assembly for use with a plurality of fuel assemblies and a neutron moderator in a nuclear reactor core, said fuel assembly comprising: spaced upper and lower tie plates having fuel element support means forming a plurality of fuel element positions; a plurality of first fuel elements in central ones of said fuel element positions to form a central cluster, said first fuel elements containing initial fissile plutonium; a plurality of second fuel elements in fuel element positions surrounding said central cluster, the initial fissile fuel in said second fuel elements consisting of fissile uranium; an elongated continuous hollow tube in one of said fuel element positions within said central cluster; means forming an entrance for moderator into said tube; means forming an outlet for moderator from within said tube; a plurality of fuel element spacers at intermediate positions between said tie plates; and spacer capture means including a plurality of axially spaced lugs fixed to said tube for engaging said spacers to retain said spacers at said intermediate positions.

13. The fuel assembly of claim 12 wherein said tube is of substantially the same outside diameter as said fuel elements.

14. The fuel assembly of claim 12 including two of said hollow tubes within said cluster.

15. The fuel assembly of claim 14 wherein at least one of said tubes is interchangeable with at least some of said fuel elements in said support means.

16. The fuel assembly of claim 12 wherein one of said fuel elements contains a burnable poison.

17. The fuel assembly of claim 12 wherein said means forming an outlet for said moderator comprises apertures in the upper half of said tube.

18. The fuel assembly of claim 12 wherein a first plurality of said fuel elements are secured to said tie plates and wherein said hollow tube and a second plurality of said fuel elements are resiliently supported between said tie plates.

19. The fuel assembly of claim 12 wherein said spacer is formed with a passage for said lug whereby said spacer is axially movable along said tube to said intermediate position when said tube is in a first angular position with respect to said spacer.

20. The fuel assembly of claim 19 further including releasable anti rotation means to prevent rotation of said tube to retain said tube in a second angular position with respect to said spacer wherein said lug engages said spacer to retain said spacer in said intermediate position.

21. The fuel assembly of claim 20 wherein said anti rotation means includes a lower end plug of square cross section fixed to said tube and mating square socket in said lower tie plate.

* * * * *

UNITED STATES PATENT OFFICE
CERTIFICATE OF CORRECTION

Patent No. __3,802,995__   Dated __9 April 1974__

Inventor(s) __J. R. Fritz/F. R. Channon__

It is certified that error appears in the above-identified patent and that said Letters Patent are hereby corrected as shown below:

Column 1, line 59-60, "ueutron" should be --neutron--; line 60-61, "neutron" should be --member--.

Signed and sealed this 19th day of November 1974.

(SEAL)
Attest:

McCOY M. GIBSON JR.
Attesting Officer

C. MARSHALL DANN
Commissioner of Patents